US010972647B2

(12) United States Patent
Setos

(10) Patent No.: US 10,972,647 B2
(45) Date of Patent: Apr. 6, 2021

(54) SYSTEM TO CONTROL CAMERA FUNCTION REMOTELY

(71) Applicant: Andrew Setos, Pacific Palisades, CA (US)

(72) Inventor: Andrew Setos, Pacific Palisades, CA (US)

(73) Assignee: CAMERA CONTROL AT A DISTANCE, LLC, Pacific Palisades, CA (US)

( * ) Notice: Subject to any disclaimer, the term of this patent is extended or adjusted under 35 U.S.C. 154(b) by 0 days.

(21) Appl. No.: 16/170,737

(22) Filed: Oct. 25, 2018

(65) Prior Publication Data

US 2019/0253605 A1 Aug. 15, 2019

Related U.S. Application Data

(60) Provisional application No. 62/628,630, filed on Feb. 9, 2018.

(51) Int. Cl.
*H04N 5/232* (2006.01)

(52) U.S. Cl.
CPC ..... *H04N 5/23203* (2013.01); *H04N 5/23296* (2013.01); *H04N 5/23299* (2018.08)

(58) Field of Classification Search
CPC .......... H04N 5/23203; H04N 5/23296; H04N 5/23299; H04N 5/2258; H04N 5/2351; H04N 5/2353; H04N 5/23206; H04N 5/23293; H04N 5/247; H04N 5/77; H04N 7/181; F21V 21/15; F21V 9/00; F21V 9/08; F21V 9/40; G06F 3/14; H05B 37/029; H05B 37/0227; H05B 37/0245; H05B 37/0272; F21W 2131/406

USPC ...................................................... 348/211.14
See application file for complete search history.

(56) References Cited

U.S. PATENT DOCUMENTS

| 5,164,827 A | | 11/1992 | Paff | |
| 5,434,617 A | * | 7/1995 | Bianchi | G01S 3/7865 348/170 |
| 5,517,236 A | * | 5/1996 | Sergeant | G08B 13/19626 348/143 |

(Continued)

OTHER PUBLICATIONS

International Search Report and Written Opinion dated Dec. 26, 2018 for corresponding PCT/US18/57527, 8 pages.

(Continued)

*Primary Examiner* — Pritham D Prabhakher
(74) *Attorney, Agent, or Firm* — Ohlandt, Greeley, Ruggiero & Perle, L.L.P.

(57) ABSTRACT

The present disclosure provides a system that includes a camera, a shadow device that mimics, copies, or duplicates the properties of the camera, and a controller. The controller can be located in the same vicinity as the shadow device, where the camera is in a remote location. An operator can receive feedback that mimics what they would be experiencing if they were operating the camera directly. The controller then manipulates the remote camera based on the input from the operator. The system of the present disclosure allows for a camera operator to be in a remote location, and it still provides accurate, real-time feedback to the operator. Unlike current systems, the present system provides instantaneous or near-instantaneous feedback for cameras in remote locations.

12 Claims, 3 Drawing Sheets

(56) References Cited

U.S. PATENT DOCUMENTS

| | | | |
|---|---|---|---|
| 6,864,911 B1 | 3/2005 | Zhang | |
| 7,742,077 B2* | 6/2010 | Sablak | H04N 5/23254 348/208.99 |
| 7,990,422 B2* | 8/2011 | Ahiska | H04N 5/23296 348/218.1 |
| 8,310,554 B2* | 11/2012 | Aggarwal | G01S 3/7864 348/211.11 |
| 8,390,675 B1* | 3/2013 | Riederer | H04N 13/246 348/47 |
| 8,488,001 B2* | 7/2013 | Mohanty | H04N 7/181 348/159 |
| 9,497,388 B2* | 11/2016 | Huang | H04N 5/232061 |
| 9,892,606 B2* | 2/2018 | Venetianer | H04N 7/181 |
| 10,330,292 B2 | 6/2019 | Conti et al. | |
| 10,405,413 B2* | 9/2019 | Feeney | G06F 3/04812 |
| 10,678,220 B2 | 6/2020 | Farnik et al. | |
| 2006/0056056 A1* | 3/2006 | Ahiska | G08B 13/19643 359/690 |
| 2012/0293680 A1* | 11/2012 | Guan | H04N 7/181 348/222.1 |
| 2013/0120984 A1* | 5/2013 | Hinrichs | F21V 21/14 362/235 |
| 2013/0128054 A1* | 5/2013 | Densham | G03B 21/53 348/169 |
| 2013/0210563 A1* | 8/2013 | Hollinger | A63B 43/06 473/570 |
| 2015/0120975 A1 | 4/2015 | Sengoku | |
| 2018/0160507 A1* | 6/2018 | Feeney | H05B 47/155 |
| 2019/0156579 A1* | 5/2019 | Sheftel | H04N 5/23293 |
| 2019/0215438 A1* | 7/2019 | Lee | H04N 5/232061 |
| 2019/0266414 A1* | 8/2019 | Stawiszynski | G06K 9/00778 |

OTHER PUBLICATIONS

International Preliminary Report on Patentability dated Aug. 20, 2020 from corresponding PCT/US2018/057527, 7 pages.

* cited by examiner

SYSTEM TO CONTROL CAMERA FUNCTION REMOTELY

CROSS-REFERENCE TO RELATED APPLICATION

The present application claims priority to U.S. Provisional Ser. No. 62/628,630, filed on Feb. 9, 2018, which is herein incorporated by reference.

BACKGROUND OF THE DISCLOSURE

1. Field of the Disclosure

The present disclosure relates to systems for remotely controlling the operation of cameras, highly directional sound microphones, or other similar devices. In particular, the present disclosure provides a system including a remote device and a shadow device, the latter of which an operator can use to manipulate the remote device. The system of the present disclosure is particularly suitable for essentially unrehearsed, live capture events such as sporting events, performances, or award shows.

2. Discussion of the Related Art

In applications such as sporting events, current systems for remotely controlling the positioning of cameras rely on motors to translate the commands of a person adjusting a control interface, typically a set of "joysticks". An experienced camera operator is asked to adjust the pan and tilt of the camera using these unfamiliar and non-conforming controls. This is usually done without any physical feedback, such as used in costly aerospace systems, known as "fly by wire" systems. Such feedback to the operator and the motors is crucial in achieving good outcomes, whether that be in flying an aircraft, driving a car, or operating a camera. Traditional feedback systems, however, can be very complicated and costly, thus making them unsuitable for many applications.

In addition to the high cost of such feedback systems, a further challenge of operating a camera from a remote location is the physical distance over which this feedback must be conveyed. In an aircraft the distances are small, i.e. the length from the cockpit to the tail. In remote camera operation, the distance is much longer, perhaps several thousand miles. This distance delays the feedback to the operator, reducing its efficacy significantly.

Finally, there are instances where it is preferred, indeed, required, to have the operator at a remote location. Two typical reasons for this preference are where safety of the operator is concerned or where the physical size of an operator is an impediment to co-location with the camera.

These three challenges—cost, distance, and preference—are addressed by this disclosure.

SUMMARY OF THE DISCLOSURE

The system of the present disclosure has a shadow device, a remote camera at a distance from the shadow device, and a controller in communication with each. A user or operator manipulates the shadow device. The controller then sends signals to the remote camera to move the camera in the same way. Importantly, the shadow device has physical properties that correspond to, copy, or adequately duplicate those of the remote camera.

Accordingly, in one embodiment, the present disclosure provides a system for remote control of a device. The system has a remote device with a mass and a center of mass; a shadow device that copies the mass and the center of mass of the remote device; and a controller that is in communication with the remote device and the shadow device. The remote device is at a remote distance from the shadow device and the controller, and the controller and the shadow device are located in the vicinity of one another. When a user adjusts the shadow device, the controller sends a signal to the remote device to adjust the remote device accordingly.

DETAILED DESCRIPTION OF THE DISCLOSURE

Figure 1:
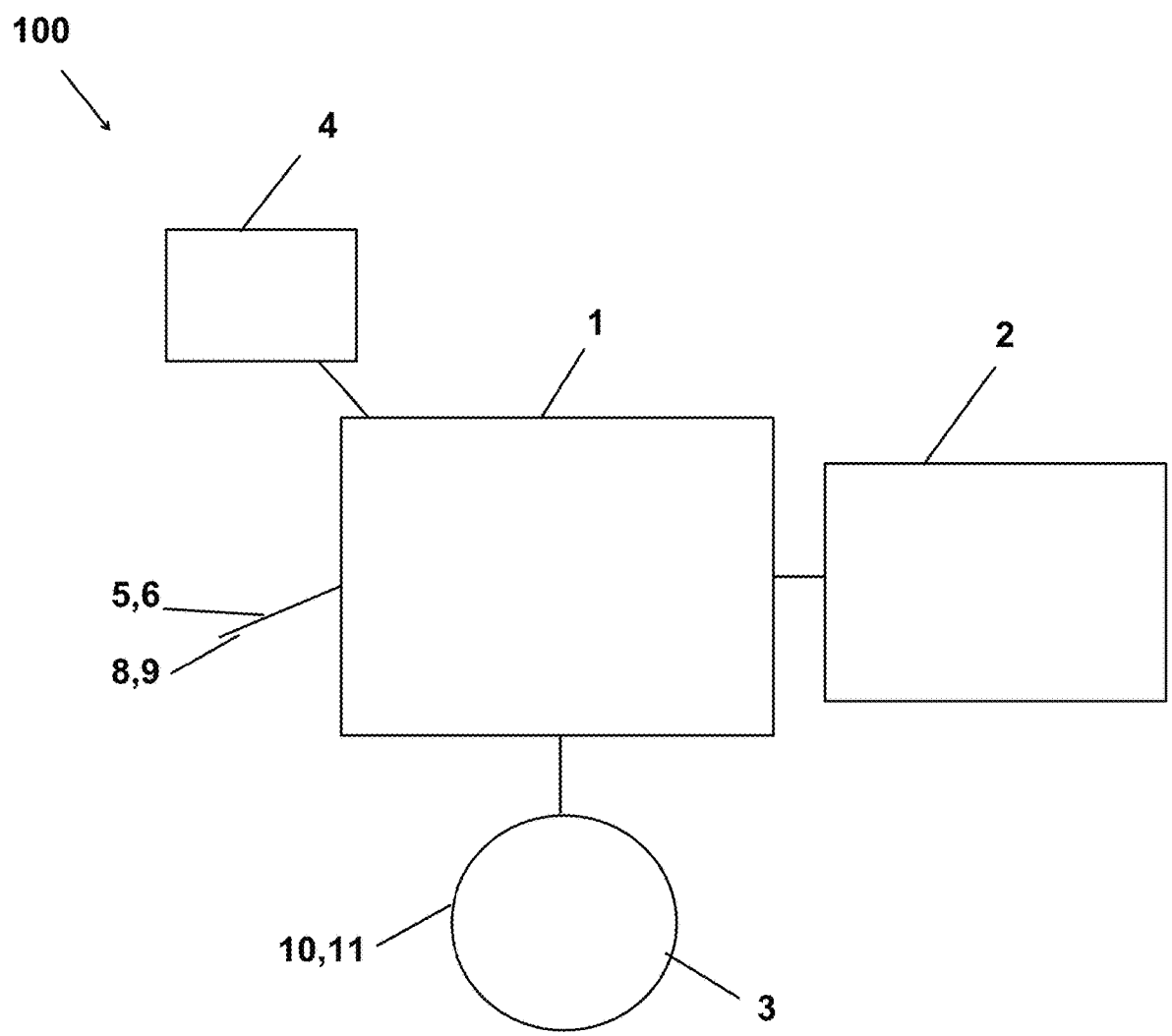
FIG. 1 shows a side schematic view of a camera according to the present disclosure.

The system of the present disclosure includes a remote camera to be manipulated by the operator, a shadow device, and a controller in communication with each of the remote camera and the shadow device. The shadow device is located in the immediate vicinity of and under the manual control of the operator. Further, the shadow device mimics, copies, or duplicates the physical characteristics of the remote camera. That is, the shadow device has components that have approximately the same mass, mass distribution, and location relative to one another as a corresponding component of the remote camera. The shadow device can be a mock camera. Alternatively, the shadow device can be a mass of any shape that mimics, copies or duplicates the above-described properties of the remote camera. Thus, the shadow device does not necessarily look the same as the remote camera, but may look the same. The shadow device, and the components discussed in greater detail below, must duplicate the corresponding components of the remote camera with adequate technical ability and precision for the task or application at hand.

As discussed in greater detail below, the operator interfaces with and manipulates the shadow device. A controller or controllers send signals to the remote camera to move according to the operator's instructions. As one example, if the operator manipulates the tilt or pan angle of the shadow device, the controller(s) will send signals to the remote camera's servo motors, to move the remote camera in a way that matches the operator's movements. The controller matches the operator's movements both mechanically and with respect to time, the latter meaning that the remote device will move as quickly or as slowly as the shadow device moves. The controllers can be embedded in the shadow device. The remote camera sends video feedback to the operator through the shadow device.

The shadow device provides haptic, resistance, and other mechanical feedback to the operator, as the operator manipulates the shadow device. There is no direct mechanical feedback from the remote camera to the operator, only from the shadow device to the operator. The shadow device is located in the immediate vicinity of the operator. This means that physical and mechanical feedback to the operator is not delivered over a great distance so that the feedback is instantaneous, eliminating the problems presented by current devices. Given that the gravitational field on the surface of the earth is adequately uniform for this purpose, and there is no relative motion between the shadow device and the remote camera, the distance from the camera to the operator is eliminated. This elimination essentially renders the feedback instantaneously, as if the operator was at the remote camera itself. A viewfinder on the shadow device can provide video feedback to the operator. Further, the physical interface, rather than being an abstraction, such as joysticks, is replaced by a facsimile of the camera itself, providing the operator a familiar, real-life, and analog control input.

As used in the present disclosure, the term "feedback" does not mean feedback as defined by audio feedback from an amplifier back to an input device. Rather, "feedback" as used in the present disclosure refers to when a component of the system sends information in response to stimuli from another component. For example, mechanical feedback can be when the shadow device offers resistance in response to the operator's attempt to move it. Video feedback can be when the remote camera sends images that it receives back to a viewfinder on the shadow device.

The system of the present disclosure can also comprise best in class servos to control the pan and tilt of the remote camera, a suitably low latency link between the operator and the remote camera, and a display or viewfinder with access to the actual image that remote camera was capturing using a low latency video conveyance with a net delay of one video frame or less. In this way, the operator can execute pan and tilt as if the operator were at the camera itself and in so doing achieve excellent results. The response of the servos and latency of the link between the controller(s)/shadow device and the remote camera must be such that they can keep up with the demands of a particular application.

In one embodiment, the circuits carrying information in either direction from the controller/shadow device to the remote camera are composed of dedicated copper conductors or dedicated fiber optic cable. If these are not available, then the circuits will be provisioned with a direct terrestrial route "wavelength access" fiber optic cable and use signaling protocols that guarantee a fixed latency and bandwidth, such as SONET or Fiber-channel, in order to achieve the lowest practical latencies. In one embodiment, circuitous fiber optic routes and satellites are not used. In another embodiment, the equipment that prepares the video or audio for transmission across these circuits is intra-frame coding such as JPEG-2000 with a latency of 1 video frame or less. In another embodiment, various MPEG encoding schemes using inter-frame coding are not used.

The distances covered in the system of the present disclosure can vary. The remote camera can be located at a distance D from the shadow device and operator, where D can be from 30 feet to thousands of miles, or subranges therebetween. In a racetrack application, for example, the shadow device and operator can be relatively close to a remote camera that is positioned right at the track's edge. The operator here can be a few dozen feet away in a relatively safe location in the grandstand. In an application where an operator is manipulating a remote camera at a soccer or football match, the operator and shadow device can be located thousands of miles away from the remote camera.

Figure 2:
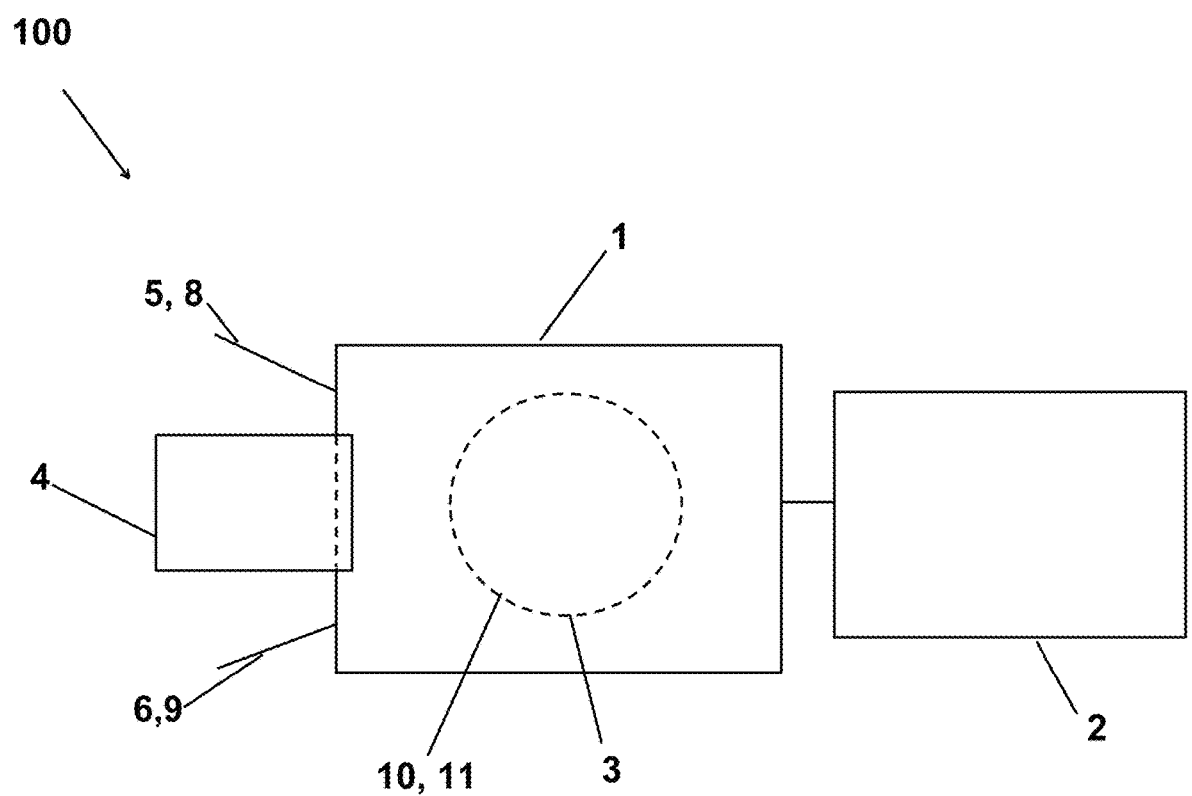
FIG. 2 shows a top schematic view of a camera according to the present disclosure.

FIGS. 1 and 2 show a schematic diagram (elevation and top view, respectively) of a shadow device 100 of the present disclosure. Shadow device 100 has a camera mass 1, lens mass 2, pan head 3, view finder 4, and two handles 8 and 9. Camera mass 1 and lens mass 2 mimic their similar components of the remote camera 100', shown in FIG. 3 and discussed in greater detail below. Camera mass 1 and lens mass 2 can be objects that have the same mass and center of mass as their corresponding components on camera 100'. Pan head 3 is a mount having a fulcrum, and that enables the operator to tilt and pan camera mass 1 and camera mass 2 as desired. Handles 8 and 9 can be connected to camera mass 1 and allow the operator to manipulate shadow device 100.

Handles 8 and 9 can have controls 5 and 6, respectively, attached thereto. Controls 5 and 6 allow the operator to adjust the zoom and focus of remote camera 100'. Shadow device 100 can also have rotary or shaft encoders 10 and 11 that translate the pan and tilt movements of shadow device 100 into signals that can be sent to remote camera 100'.

Figure 3:
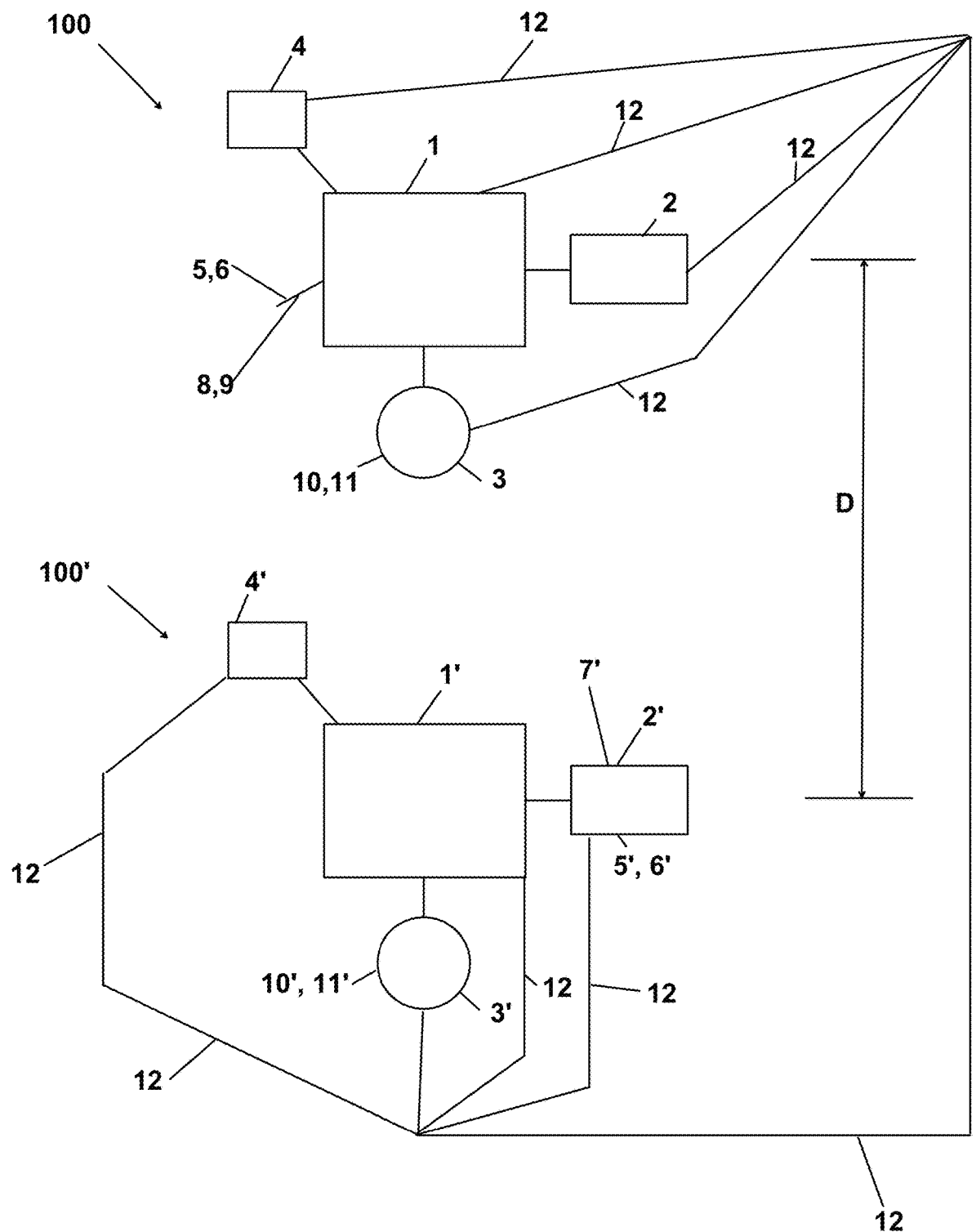
FIG. 3 shows a schematic view of the system of the present disclosure, including the camera of FIGS. 1 and 2 and a shadow device.

FIG. 3 shows the system of the present disclosure, with shadow device 100 and remote camera 100' in communication with one another. Remote camera 100' has camera 1', lens 2', pan head 3', and view finder 4'. Camera 1' and lens 2' are used by the operator to acquire images of the desired event. As previously discussed, camera mass 1 duplicates the properties of camera 1', as does lens mass 2 and lens 2'.

Pan head 3 must be identical to pan head 3'. The pan heads 3, 3' of device 100 and remote camera 100', respectively, determine how camera mass 1 and camera 1', respectively, react to forces exerted by the operator. The sameness of the pan head 3 to pan head 3' is primarily expressed in the distance, in all three dimensions, from the fulcrums of the pan heads to the centers of mass of the other components of device 100 and remote camera 100', as well as the nature of the fulcrum of the pan heads. For example, some pan heads 3 and 3' have moving fulcrums, at least in the "z" dimension (up/down). Secondarily, pan heads 3 and 3' have "friction" characteristics that are a function of the fluids or pressure plates used in the device. Again, pan head 3 must be identical to pan head 3' in all of these ways.

Since there is no operator at the site of remote camera 100', there is no need for an actual view finder. Instead of an actual view finder 4, remote camera 100' can have a view finder mass 4', which duplicates the properties of view finder 4 of shadow device 100. This ensures that shadow device 100 and remote camera 100' have the same masses, distributed the same way.

Shadow device 100 should also mimic distances between centers of mass of each of the components of remote camera 100'. For example, as shown in the Figures, there is a distance between a center of mass of camera 1' and lens 2' in remote camera 100'. This distance is replicated between camera mass 1 and lens mass 2 of shadow device 100. The same is true of the view finder mass 4, view finder 4', and pan heads 3 and 3'.

Remote camera 100' can have servos 5' and 6' that receive commands relating to zoom and focus from controls 5 and 6, respectively. Servos 5' and 6' then adjust lens 2' as instructed. Remote camera 100' can also have servos 10' and 11' that receive commands relating to tilt and pan from encoders 10 and 11, respectively. Servos 10' and 11' then adjust pan head 3 and camera 2 as instructed. Remote camera 100' can also have a video encoder 7', to send video back to view finder 4 of shadow device 100.

Shadow device 100 and remote camera 100' are in communication with one another via one or more circuits 12. As previously discussed, they can be separated by a distance D.

Although it may add significant cost, the present disclosure also contemplates that the shadow device can simulate any weather conditions that the remote camera may be facing, and which would affect its operation. For example, if the remote camera was under significant wind stress, the shadow device could simulate that as well, and provide feedback to the operator.

While the present disclosure has been described with reference to one or more particular embodiments, it will be understood by those skilled in the art that various changes can be made and equivalents can be substituted for elements thereof without departing from the scope thereof. In addition, many modifications can be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A system for remote control of a device, comprising:
   a remote camera, wherein the remote camera has a mass and a center of mass;
   a shadow device, wherein the shadow device is a mock camera, and wherein the shadow device copies the mass and the center of mass of the remote camera;
   a controller, wherein the controller is in communication with the remote camera and the shadow device,
   wherein the remote camera is at a remote distance from the shadow device and the controller, and wherein the controller and the shadow device are located in the vicinity of one another, and
   wherein, when a user adjusts the shadow device, the controller sends a signal to the remote camera to adjust the remote camera accordingly.

2. The system of claim 1, wherein the remote camera comprises:
   a lens having a mass and a center of mass;
   a camera body having a mass and a center of mass; and
   a pan head having a mass and a center of mass, wherein the pan head and the lens are operably connected to the camera body.

3. The system of claim 2, wherein the shadow device comprises:
   a lens mass, wherein the lens mass copies the mass and the center of mass of the lens;
   a camera body mass, wherein the camera body mass copies the mass and the center of mass of the camera body; and
   a second pan head, wherein the second pan head copies the mass and the center of mass of the pan head, and wherein the second pan head and the lens mass are operably connected to the camera body mass.

4. The system of claim 3, wherein the centers of mass of the lens mass, the camera body mass, and the second pan head of the shadow device are at distances relative to one another that that are equivalent to the distances that the centers of mass of the lens, camera body, and pan head are relative to one another.

5. The system of claim 4, wherein the shadow device comprises a view finder having a mass and a center of mass, and wherein the remote camera comprises a view finder mass that copies the mass and the center of mass of the view finder.

6. The system of claim 5, wherein the shadow device has a handle connected to the camera body mass, and wherein the remote camera comprises a servo, so that when an operator manipulates the handle to move the camera body mass, the servo moves the camera body accordingly.

7. The system of claim 6, wherein the shadow device has a lens control on the handle, and wherein the remote camera comprises a second servo, so that when an operator manipulates the lens control, the second servo adjusts the focus and/or zoom of the lens accordingly.

8. The system of claim 3, wherein the pan head has a first fulcrum, wherein the first fulcrum is at a first distance from the centers of mass of the lens and the camera body, wherein the second pan head is at a second distance from each of the lens mass and the camera body mass, and wherein the first distance and the second distance are equal.

9. The system of claim 8, wherein the first fulcrum and the second fulcrum each have fulcrum geometries, and wherein the fulcrum geometries are equivalent.

10. The system of claim 1, wherein the shadow device and the remote device are in communication with one another via a circuit.

11. A system for remote control of a device, comprising:
    a remote camera, wherein the remote camera comprises a lens, a camera body, and a pan head, wherein each of the lens, the camera body, and the pan head have a mass and a center of mass, and wherein the pan head and the lens are operably connected to the camera body;
    a shadow device, wherein the shadow device comprises a lens mass, wherein the lens mass copies the mass and the center of mass of the lens, a camera body mass, wherein the camera body mass copies the mass and the center of mass of the camera body, and a second pan head, wherein the second pan head copies the mass and the center of mass of the pan head, and wherein the second pan head and the lens mass are operably connected to the camera body mass;
    a controller, wherein the controller is in communication with the remote device and the shadow device,
    wherein the centers of mass of the lens mass, the camera body mass, and the second pan head of the shadow device are at distances relative to one another that are equivalent to the distances that the centers of mass of the lens, camera body, and pan head, respectively, are relative to one another,
    wherein the remote device is at a remote distance from the shadow device and the controller, and wherein the controller and the shadow device are located in the vicinity of one another, and
    wherein, when a user adjusts the shadow device, the controller sends a signal to the remote device to adjust the remote device accordingly.

12. A system for remote control of a device, comprising:
    a remote camera, wherein the remote camera comprises a lens, a camera body, and a pan head, wherein each of the lens, the camera body, and the pan head have a mass and a center of mass, wherein the pan head and the lens are operably connected to the camera body;
    a shadow device, wherein the shadow device comprises a lens mass, wherein the lens mass copies the mass and the center of mass of the lens, a camera body mass, wherein the camera body mass copies the mass and the center of mass of the camera body, and a second pan head, wherein the second pan head copies the mass and the center of mass of the pan head, and wherein the second pan head and the lens mass are operably connected to the camera body mass;
    a controller, wherein the controller is in communication with the remote device and the shadow device,
    wherein the pan head has a first fulcrum, wherein the first fulcrum is at a first distance from the centers of mass of the lens and the camera body, wherein the second pan head is at a second distance from each of the lens mass and the camera body mass, and wherein the first distance and the second distance are equal, wherein the remote device is at a remote distance from the shadow device and the controller, and wherein the controller and the shadow device are located in the vicinity of one another, and wherein, when a user adjusts the shadow device, the controller sends a signal to the remote device to adjust the remote device accordingly.

\* \* \* \* \*